United States Patent [19]

Bell

[11] 4,439,472

[45] Mar. 27, 1984

[54] UPHOLSTERY COMPONENTS

[75] Inventor: Raymond W. H. Bell, Great Kingshill, England

[73] Assignee: Dunlop Limited, London, England

[21] Appl. No.: 308,821

[22] Filed: Oct. 5, 1981

Related U.S. Application Data

[63] Continuation of Ser. No. 171,818, Jul. 24, 1980, abandoned.

[51] Int. Cl.³ .......................... B32B 3/26; B32B 5/18
[52] U.S. Cl. .......................................... 428/71; 5/459;
5/481; 297/DIG. 5; 428/76; 428/316.6;
428/320.2; 428/328; 428/921
[58] Field of Search ..................... 428/316.6, 920, 921,
428/68, 71, 76, 317.9, 318.4, 320.2, 322.7, 328;
5/459, 481; 297/DIG. 5

[56] References Cited

U.S. PATENT DOCUMENTS

| 3,803,064 | 4/1974 | Fishbein et al. | 521/107 |
|---|---|---|---|
| 4,092,752 | 6/1978 | Dorigan | 5/481 |
| 4,224,374 | 9/1980 | Priest | 521/906 |
| 4,254,177 | 3/1981 | Fulmer | 428/256 |

FOREIGN PATENT DOCUMENTS

| 1339441 | 6/1971 | United Kingdom | 428/304.4 |
|---|---|---|---|
| 1339441 | 12/1973 | United Kingdom . | |
| 1519795 | 10/1976 | United Kingdom | 428/304.4 |
| 1519795 | 8/1978 | United Kingdom . | |

Primary Examiner—Bruce H. Hess
Attorney, Agent, or Firm—Stevens, Davis, Miller & Mosher

[57] ABSTRACT

A flame-retardant upholstery component consists of a core of a polyurethane foam, which foam collapses on application of a flame thereto, said core being covered with a layer of a foam material which has been impregnated with a flame-retardant substance.

5 Claims, No Drawings

UPHOLSTERY COMPONENTS

This is a continuation of application Ser. No. 171,818 filed July 24, 1980, now abandoned.

This invention relates to upholstery components and in particular to upholstery components which exhibit flame-retardant properties in a fire situation.

Such flame-retardant upholstery components should ideally conform to the conditions laid down by the Department of the Environment (U.K.) in its Specification No. 4. The said D.O.E. Specification prescribes that, after two minutes from the cessation of burning of an ignition source, all flaming, smoke emission and smouldering shall have ceased and that the overall structure of the component shall remain sufficiently whole to prevent combustion of its filling.

Cellular materials (e.g. foams) are well known as fillers for upholstery components and their relative ease of manufacture, together with their hygienic and non-allergenic properties, makes them ideal for this purpose.

However, increasing public awareness of the dangers associated with foam combustion (especially the rapid spread of flame and the emission of toxic products of combustion) has made it necessary to search for a foam which is both suitable for use as an upholstery filling and which exhibits a satisfactory degree of flame-retardance in a fire situation.

We have found that satisfactory flame-retardance in foam-filled upholstery components may be achieved by covering a core of a flame-collapsible (as herein defined) polyurethane foam with a further layer of foam which has been impregnated with a flame-retardant substance. The covered core may be enclosed in an outer fabric casing (which itself may have been treated with a flame-retardant substance).

Accordingly, the present invention provides a method of making a flame-retardant upholstery component having a core of a flame-collapsible (as herein defined) polyurethane foam, in which the core is covered with a layer of foam material which has been impregnated with a flame-retardant substance.

The present invention also provides a flame-retardant upholstery component comprising a core of a flame-collapsible (as herein defined) polyurethane foam, the core being covered with a layer of foam material which has been impregnated with a flame-retardant substance.

The covered core may be enclosed in a fabric casing, and the casing may itself have been treated with a flame-retardant substance.

By "flame-collapsible foam" is meant a foam which collapses on application of a flame and thereby presents a reduced surface area to the flame without sustained burning, for example a foam as described in our U.K. Pat. No. 1,339,441, comprising the reaction product of a polymeric polyol, a tolylene diisocyanate, a foam modifier, an anti-ageing additive and an anti-shrinkage agent for the foam.

Other suitable foams are the so-called "high-resilience" foams. These may be produced by various known methods. Some methods make use of a reaction between an ethylene oxide-tipped poly(oxyalkylene) triol and one of the following isocyanates:
 (a) Modified tolylene di-isocyanate,
 (b) Tolylene di-isocyanate plus a cross-linking agent,
 (c) Crude (diphenyl) methane diisocyanate
 (d) A mixture of crude (diphenyl) methane diisocyanate and tolylene diisocyanate.

Alternatively, a specially-modified poly(oxyalkylene) triol (polymeric polyol) may be reacted with tolylene diisocyanate.

Suitable flame-retardant substances for impregnating the layer of foam material covering the core include suspensions of a hydrated alumina in a natural or synthetic rubber latex (as described in our U.K. Pat. No. 1,519,795).

Foams which are suitable for use as the core and the covering of upholstery components according to the present invention include, for example, those polyurethane foams available from Dunlop Limited, (Dunlopillo Division), as DP 107 and DHR 264 (core) and as D7 (covering). DP 107 is a flame-collapsible foam; DHR 264 is a high-resilience form and D7 is a conventional foam.

Tests to ensure that the upholstery components according to the present invention satisfy the conditions laid down in the aforesaid D.O.E. Specification are carried out as follows.

(i) "Large crib" test

Ten sticks of softwood, each of dimensions 80 mm×12.5 mm×12.5 mm and conditioned to a moisture content of 12%, are stacked 5 layers high, two sticks to each layer in alternate directions, and glued at the ends of the sticks by means of a p.v.a.-based adhesive. Sufficient wood wool is placed in the cavity defined by the sticks to give a total "crib" weight of 75 g. The wood wool is ignited by means of a match.

(ii) "Double crib" test

Two cribs, each constructed as described in the immediately preceding paragraph and containing, in toto, sufficient wood wool to give an overall "double crib" weight of 150 g, are placed side-by-side. The wood wool is ignited by means of a match.

The present invention will be illustrated by means of the following examples. In the examples, an upholstery component in the form of a miniature mattress was supported on a metal frame. In the "large crib" and "double crib" tests, the crib was placed in the centre of the upper horizontal surface of the mattress.

EXAMPLE 1

A miniature mattress, having a core of DP 107 foam wrapped with a ½" thick layer of D7 foam (previously impregnated with a suspension of hydrated alumina in a neoprene latex) and enclosed in a cotton cover treated with a flame-retardant substance, was subjected to the "large crib" test. All charring and emission of smoke ceased within 3 minutes of the crib extinguishing.

EXAMPLE 2

A miniature mattress, constructed as described in Example 1, was subjected to the "double crib" test. The performance of the sample was similar to that under the conditions of the "large crib" test, but the sample continued to emit smoke for about 5 minutes after removal of the crib embers.

EXAMPLE 3

A miniature mattress, having a core of DHR 264 foam wrapped with a ½" thick layer of impregnated D7 foam and enclosed in a cotton cover treated with a flame-retardant substance, was subjected to the "large crib" test.

All charring and emission of smoke ceased within 3 minutes of the crib extinguishing.

In the two following "Control" examples, the "large crib" test was carried out on a miniature mattress comprising a core of a foam material which does not exhibit "flame-collapsibility".

CONTROL EXAMPLE A

A miniature mattress, comprising a core of a conventional polyurethane foam (available from Dunlop Limited-Dunlopillo Division as D 15) was enclosed in a cotton cover treated with a flame-retardant substance and subjected to the "large crib" test.

The cover split, allowing the burning crib to collapse into the already-ignited foam core. Complete ignition of the core occurred and the resulting fire had to be extinguished.

CONTROL EXAMPLE B

A miniature mattress, comprising a core of D 15 foam wrapped with a ½" thick layer of the impregnated foam and enclosed in a cotton cover treated with a flame-retardant substance, was subjected to the "large crib" test.

The mattress developed a self-sustaining char which continued to burn for 40 minutes before being extinguished.

Throughout the foregoing description and Examples, the term "flame-retardant" has the meaning assigned to it in British Standard Specification No. 4422 (Glossary of terms associated with fire).

Whilst the present invention has been described with particular reference to mattresses, it is to be understood that the concept is equally applicable to cushions, pillows, seat squabs and the like.

Having now described my invention, what I claim is:

1. An upholstery component which retards smouldering, comprising:
   an unimpregnated core made of flame-collapsible polyurethane foam which collapses on application of a flame thereto, thereby presenting a reduced surface area of the flame without sustained burning; and
   a layer of a non-flame-collapsible foam material wrapped about said core, said layer having been impregnated with a flame-retardant substance, said substance being a suspension of a hydrated alumina in a latex, whereby said layer and said core cooperate to produce said upholstery component.

2. The component of claim 1, wherein said polyurethane foam core is made from a foam which is the reaction product of a polymeric polyol, a tolylene di-isocyanate, a foam modifier, an anti-ageing additive and an anti-shrinkage agent for the foam.

3. The component of claim 1, wherein said core is made of a "high-resilience" foam polyurethane.

4. The component of claim 1, wherein said foam-covered core is enclosed in a fabric casing.

5. The component of claim 4, wherein said fabric casing has itself been treated with a flame-retardant substance.

* * * * *